United States Patent

Burger

[15] 3,637,187
[45] Jan. 25, 1972

[54] VALVE WITH AXIALLY SPACED GUIDES AND BELLOWS OPERATOR

[72] Inventor: Manfred Burger, Munich, Germany

[73] Assignee: Daniel Stephen Delany, London, England part interest.

[22] Filed: Nov. 12, 1969

[21] Appl. No.: 876,018

[30] Foreign Application Priority Data

May 5, 1969 Germany ................... P 19 22 886.5

[52] U.S. Cl. .......................... 251/61.3, 251/57, 251/61.4, 251/282
[51] Int. Cl. ............................ F16k 31/145, F16k 41/10
[58] Field of Search ............ 137/219; 251/61.2, 61.3, 61.4, 251/61.5

[56] References Cited

UNITED STATES PATENTS

| 1,294,151 | 2/1919 | Page | 137/271 X |
|---|---|---|---|
| 2,631,600 | 3/1953 | Flanagan | 137/269 |
| 2,679,259 | 5/1954 | Haeberlein | 251/61.4 X |
| 3,493,008 | 2/1970 | Slaglione | 137/219 |

FOREIGN PATENTS OR APPLICATIONS

| 1,049,074 | 1/1959 | Germany | 251/61.4 |

Primary Examiner—Arnold Rosenthal
Attorney—Kelman & Berman

[57] ABSTRACT

A valve having a straight tubular housing is provided with a transverse valve seat and a valve disc mounted on a stem having two axially spaced portions which are guided by elements fixed on the valve housing for precisely axial movement of the valve disc toward and away from the valve seat. The valve stem is moved by pressure fluid in bellows in one direction, and by a return spring and/or pressure of the controlled fluid in the other direction.

12 Claims, 6 Drawing Figures

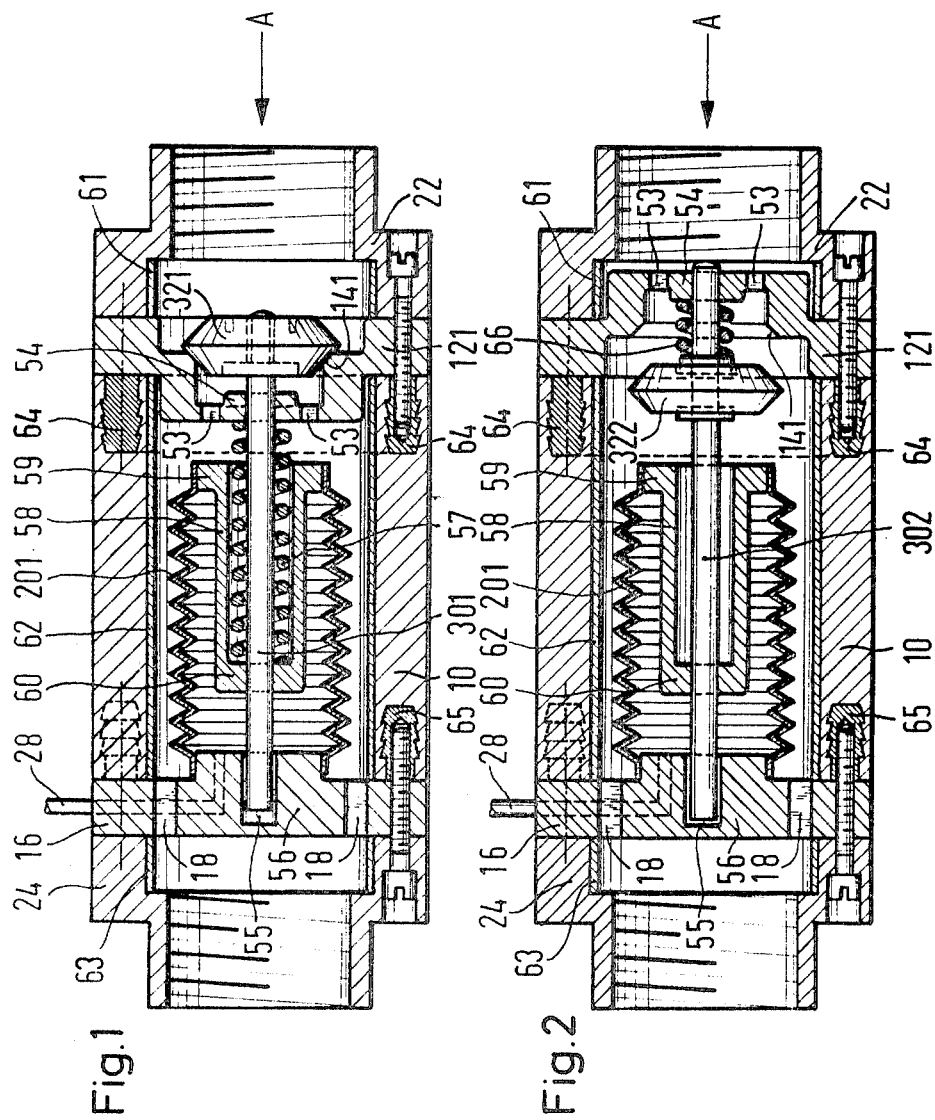

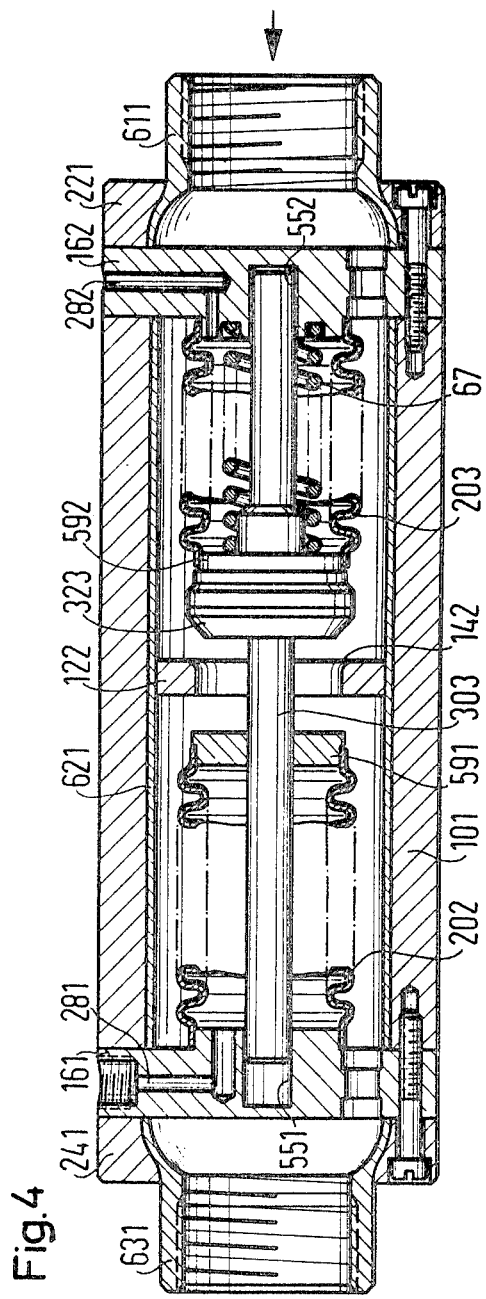

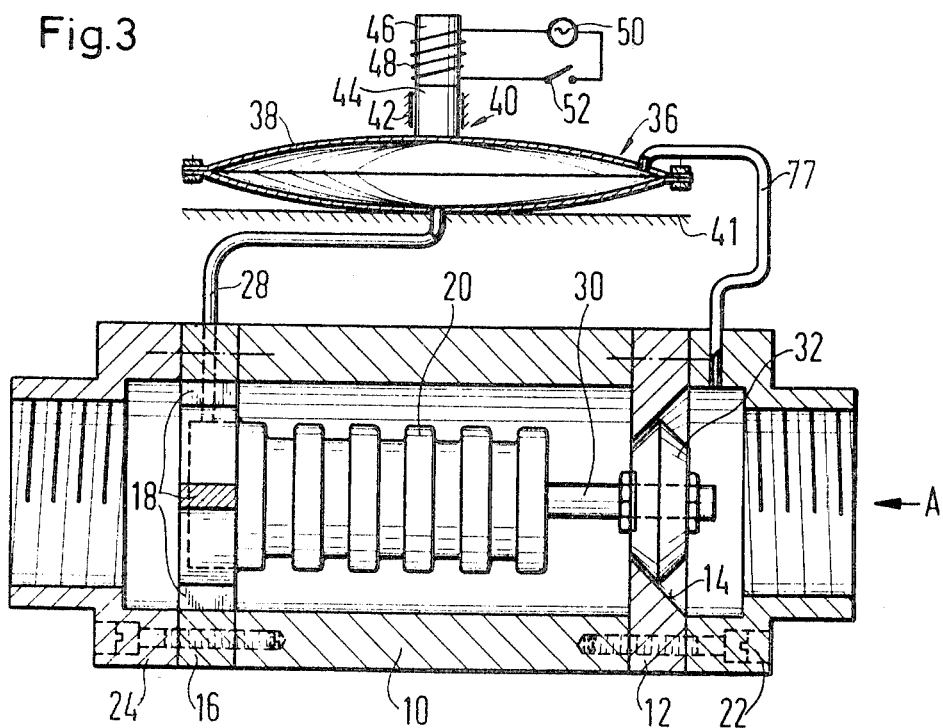

INVENTOR.
Manfred Burger
By: Kelman and Berman
AGENTS

VALVE WITH AXIALLY SPACED GUIDES AND BELLOWS OPERATOR

This invention relates to valves, and particularly to a straight-way valve whose inlet and outlet nipples are coaxially aligned with the valve housing.

In its more specific aspects, the invention is concerned with improved straight-way valves equipped with bellows in the valve housing, one axial end of the bellows being mounted on a spider, and the other axial end being fastened to a valve body for movement with the latter toward and away from a position in which the valve member seals an aperture in a valve seat transverse to the housing axis.

An object of the invention is the provision of such a valve in which perfect seating of the valve member on the valve seat is ensured by adequate guiding of the valve member toward and away from the aforementioned position.

The known valves of the aforedescribed type require frequent maintenance because the valve member is not precisely aligned with the valve seat, and stresses are asymmetrically distributed in the valve member, the valve seat and particularly the bellows of the valve, thereby causing relatively rapid wear.

It has now been found that the useful life of a valve of the general type described above can be extended significantly and its reliability increased by precisely guiding the valve member toward and away from the valve seat in an axial direction.

According to the invention, the principal elements of the valve thus include a housing having two axial ends open for flow of a fluid through the housing in the direction of its axis, a valve seat member in the housing defining an aperture extending through the valve seat member in said direction, and a valve member axially movable in the housing toward and away from a position of engagement with the valve seat member in which the valve member seals the aperture in the valve seat member. One axial end of a bellows member, which is axially expandable and contractable in the housing is fixedly fastened to a spider arrangement which itself is fixedly fastened in the housing. A conduit communicates with the otherwise sealed chamber in the bellows for flow of fluid into and out of the chamber. A motion transmitting linkage connects the other axial end of the bellows to the valve member for moving the valve member toward and away from its aforementioned position during expansion and contraction of the bellows. A guide arrangement guides the valve member in an axial direction.

The preferred motion transmitting linkage consists essentially of a valve stem which is fastened to the valve member and to the bellows, and which is engaged by the guide arrangement.

Other features, additional objects and many of the attendant advantages of this invention will readily become apparent from the following detailed description of preferred embodiments when considered in conjunction with the appended drawing in which:

FIG. 1 shows a tubular shutoff valve of the invention in axial section;

FIG. 2 illustrates a valve closely similar to that of FIG. 1 in a corresponding view;

FIG. 3 shows a valve of the invention and an associated control apparatus in section partly on the axis of the valve;

FIGS. 4 and 5 illustrate respective additional valves of the invention in axial section.

Figure 6:
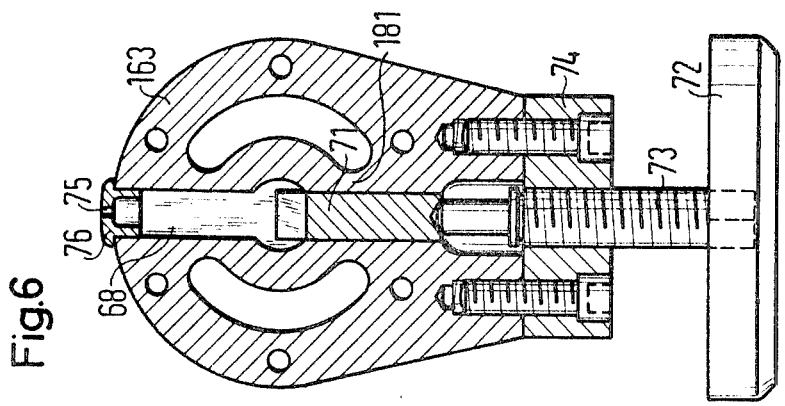
FIG. 6 shows the valve of FIG. 5 in radial section on the line VI—VI.

Referring now to the drawing in detail, and initially to FIG. 1, there is seen a cylindrical shell or valve housing 10 whose cavity is axially bounded by a centrally apertured end wall 121 and a peripherally apertured end wall 16. The end walls 121, 16 are flanged between annular end faces of the housing 10 and between an inlet nipple 22 and an outlet nipple 24 respectively.

The nipples 22, 24 and the housing 10 are aluminum castings whose internal surfaces are protected against the corrosive effects of the fluid passing straight through the valve by tubular linings 61, 62, 63 of austenitic stainless steel, and the end walls 121, 16 are made of the same material. To provide adequate anchorage for the screws which pass through the end walls and attach the nipples to the housing 10, a steel ring 64 is coaxially cast into the wall of the housing near one axial end, and provided with threaded bores, and internally threaded sleeves 65 are embedded in the other axial end of the housing 10 in circumferentially spaced relationship.

The apertured central portion of the end wall 121 is axially offset from the flanged periphery of the wall, and the shoulder formed by the offset provides a valve seat 141 normally engaged by a conically tapering valve disc 321 of somewhat resilient plastic. There are enough axial passages arranged in a circle about the housing axis in the central portion of the end wall 121 to reduce the flow resistance of the wall to a minimum, and to leave radial spokes 53 supporting a central spider 54 in which a cylindrical valve stem 301 is axially guided.

One end of the stem 301 is fixedly fastened to the valve disc 321. A helical compression spring 57 is coiled about the stem 301. One end of the spring abuts against the spider 54, and the other end abuts against the bottom wall 60 of a narrow cup-shaped receptacle 58 which spacedly and coaxially envelops the spring 57. The other end of the stem 301 passes through the bottom wall 60 and into a blind bore 55 in the axially enlarged central portion 56 of the end wall 16 which is surrounded by a circular row of axial passages near the periphery of the end wall 16, leaving radial spokes 18. The stem 301 is fixedly fastened and sealed to the bottom wall 60.

A bellows 201 is coaxially fastened to the central wall portion 56 and to the rim 59 of the receptacle 58. A conduit 28 leads from a radial face of the wall portion 56 in the interior of the bellows 201 through the end wall 16 and radially outward of the valve for connection to a source of fluid under pressure.

The valve disc 321 is normally held against the seat 141 by the spring 57, by the axially tensioned bellows 201, and by the pressure of the fluid controlled by the valve which flows in the direction of the arrow A when the valve is opened. The valve is opened for practically straight flow of fluid from the inlet nipple 22 to the outlet nipple 24 when control fluid under sufficient pressure is admitted to the bellows 201 through the conduit 28. The valve disc 321 is precisely guided toward and away from the valve seat 141 by the stem 301 whose two ends are centered in the spider 54 and in the spiderlike central portion 56 of the end wall 16.

Because of the proximity of the spider 54 to the junction between the stem 301 and the valve disc 321, the disc is engaged with the valve seat 141 in precise alignment without radial play or deviation. The spring 57 which biases the valve disc 321 toward the closed position reduces the stresses in the bellows 301 and extends the useful life span of the bellows by preventing overextension of the bellows. The valve closes promptly and securely even if the valve disc 321 and the valve seat 141 should be slightly worn or contaminated with solids. The axial length of the valve is not significantly increased by the spring because of the provision of the receptacle 58.

The normally open valve illustrated in FIG. 2 differs from the aforedescribed valve mainly by a reversal of the end wall 121 whose valve seat 141 faces the bellows 201, whereas the valve seat in FIG. 1 faces outwardly toward the inlet nipple 22. The two ends of a stem 302 closely similar to the stem 301 are respectively received in the bore of the spider 54 and in the blind bore 55 of the spiderlike central portion 56 of the end wall 16. The stem passes centrally through a valve disc 322, not otherwise different from the aforedescribed valve disc 321, and is normally held spaced from the valve seat 141 toward the bellows 201 by a short helical compression spring 66 which replaces the spring 57 described above.

The valve disc 322 is moved against the valve seat 141 in precise alignment when the bellows 201 is inflated and axially expanded by pressure fluid admitted through the conduit 28.

The spring 66 which biases the valve disc 322 toward its normal position reduces stresses in the bellows 201 and thereby improves the reliability of the valve. The useful life of the bellows is also extended by the fact that two axially widely spaced portions of the stem 302 are guided in elements fixed to the valve housing 10 so that the bellows is not subject to stresses transverse to its axis.

The valve illustrated in FIG. 3 is similar to that shown in FIG. 1. It has a cylindrical valve housing 10 whose cavity is axially bounded by apertured end walls 12 and 16. An outwardly facing valve seat 14 about the central aperture of the end wall 12 is normally engaged by a valve disc 32 fixedly attached to one end of a stem 30. The end wall 12 is coaxially flanged between the valve housing 10 and an inlet nipple 22. The peripheral portion of the end wall 16 is similarly flanged between the housing 10 and an outlet nipple 24.

The central portion of the end wall 16 is connected with the peripheral portion only by four narrow spokes 18. It is coaxially attached to one axial end of bellows 20 whose other end is attached to the stem 30. The resilient bellows is tensioned at all times so as to keep the valve disc 32 normally engaged with the valve seat 14. When the valve is opened, liquid flows through the valve in the direction of the arrow A from the inlet nipple 22 to the outlet nipple 24, and the pressure of the liquid assists in keeping the valve closed. The bellows 20 is not subject to transverse stresses under any operating conditions.

It can be opened by means of a hydraulic actuator 40 which includes a resilient pressure vessel 36 mainly consisting of two dished metal membranes 38 whose circular rims are sealed to each other. One of the membranes rests on a fixed horizontal support 41. The other one is provided with a central plunger 44 axially guided in a fixed bearing 42 and attached to the armature 46 of a solenoid 48. The solenoid coil is arranged in series circuit with a current source 50 and a switch 52. The vessel 36 is connected with the interior of the bellows 20 by the conduit 28 and with the body of liquid under pressure in the inlet nipple 22 by a restricted bleeder tube 77.

When the switch 52 is closed, the solenoid 48 attracts its armature 46 and thereby pushes the plunger 42 and the attached membrane 38 inwardly of the vessel 36. Because of the great difference in flow section between the conduit 28 and the bleeder tube 77, the liquid displaced from the vessel 36 expands the bellows 20 and opens a passage in the valve seat 14. When the switch 52 is opened, the vessel 36 expands resiliently, and the valve 32 returns to the illustrated closed position. Because of the pressure equalizing effect of the tube 77, only little power is required of the solenoid 48.

The valve shown in FIG. 4 has a straight tubular housing 101 provided at its ends with inlet and outlet nipples 221, 241 respectively. Apertured radial end walls 161, 162 of stainless steel are flanged between the housing 101 and the nipples respectively, and the nipples and the housing are protected by internal stainless steel liners 611, 621, 631. The spiderlike central portions of the end walls 221, 241 are provided with blind bores 551, 552 in which the two ends of a stem 303 are received for limited axial movement.

The stem 303 passes through the wide central aperture of an annular partition 122 approximately axially centered in the housing 101. The stem 303 carries a fixed valve disc 323 on one side of the partition 122 opposite a valve seat 142 on the latter, and a fixed disc 591 on the other side of the partition. A first bellows 202 is sealed to the end wall 161 and to the disc 591, and a second bellows 203 of the same effective cross section is fastened at one axial end to the end wall 162 whereas the free rim of the second bellows is sealed to a collar 592 on the valve disc 323. The effective cross section of the bellows 202 is equal to the area of the valve seat 142 which is covered by the valve disc 323 in the closed valve. A helical compression spring 67 is coiled about the valve stem 303 between the end wall 162 and the valve disc 323 in the bellows 203. Conduits 281, 282 respectively permit fluid to be introduced into the interiors of the bellows 202, 203 through the end walls 161, 162.

In the embodiment illustrated, the conduit 282 connects the second bellows 203 to the atmosphere, and the conduit 281 is connected to a source of pressure fluid through a control valve in a manner not further illustrated. The valve is shown in the position assumed when the bellows 202 is filled with pressure fluid, hydraulic or pneumatic, under a pressure sufficient to overcome the restraint of the spring 67 which normally holds the valve disc 323 against the valve seat 142. While the pressure of liquid or gas on the valve disc tends to keep the valve closed, the same pressure is also applied to the bellows 203 and tends to compress the bellows so that the valve-opening pressure in the bellows 202 need only be high enough to overcome the spring 67 and is independent of the line pressure in the nipple 221, a feature valuable in high-pressure operations. In the open valve, the pressure applied by the controlled fluid on the bellows 202 is compensated by the pressure on the bellows 203.

Figure 5:
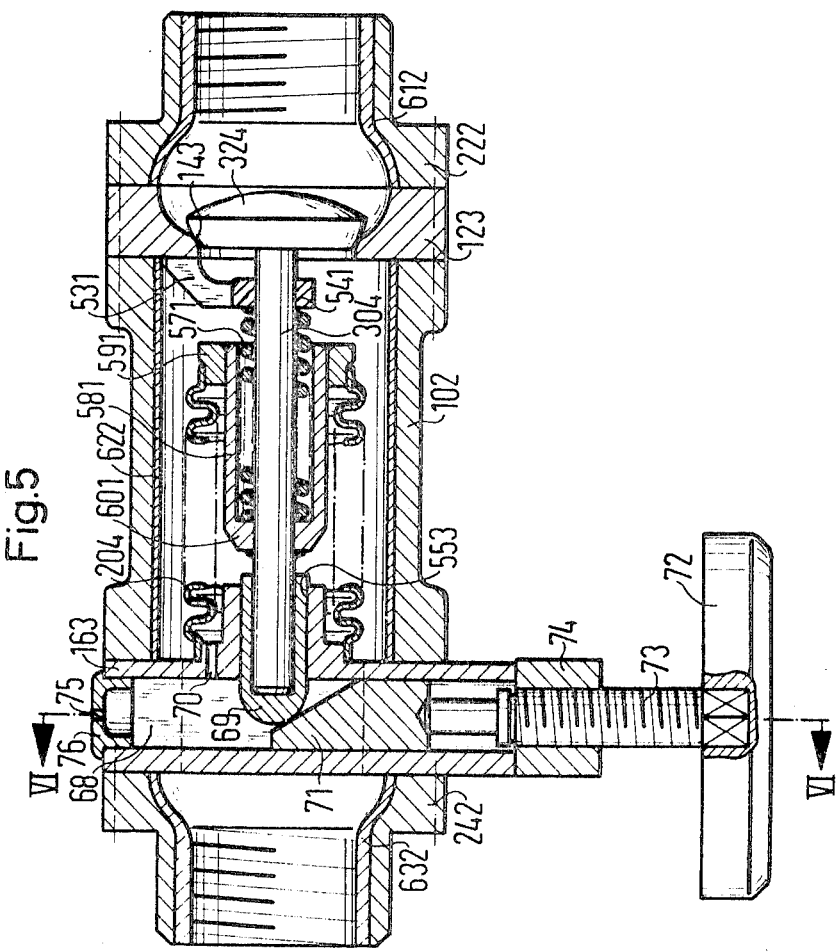

The valve shown in FIGS. 5 and 6 has a housing 102 whose inner cylindrical wall is protected by a stainless steel liner 622. Inlet and outlet nipples 222, 242 similarly protected by liners 612, 632 clamp apertured end walls 123, 163 to the housing 102 as described with reference to other figures, but not explicitly shown in FIGS. 5 and 6. The large central aperture in the end wall 123 is normally closed by a valve disc 324 engaging a seat 143 on the wall 123 and fixedly fastened to one end of a valve stem 304.

The stem 304 passes slidably through a spider 541 held in fixed position by its sole spoke 531. The spider serves as one of two abutments for a helical compression spring 571 coiled about the stem 304, the other abutment being the bottom wall 601 of a narrow, cup-shaped receptacle 581 which spacedly surrounds the spring. The stem 304 passes through the bottom wall 601 in fixed, sealing engagement. The end of the stem 304 remote from the valve body 324 is covered with a sleeve 69 slidably received in a guide bore 553 of the end wall 163 and having a closed hemispherical end which extends into a diametrical bore 68 in the end wall 163 which is rectangular in cross section. A wedge-shaped cam 71 is slidably received in the bore 68, and the materials of the sleeve 69 of the wedge 71 are selected to hold friction to a minimum. The cam 71 is rotatably attached to the inner end of a threaded spindle 73 which extends outwardly from the bore 68 through a nut 74 fixedly fastened to the end wall 163, and whose free outer end carries a handwheel 72.

A bellows 204 is mounted coaxially in the housing 102 between the end wall 163 and the rim 591 of the receptacle 581. The bore 68 communicates with the interior of the bellows through an axial bore 70 in the end wall 163 and with the surrounding atmosphere through an opening 75 in a plug 76 which otherwise closes the end of the bore 68 remote from the nut 74.

The valve shown in FIGS. 5 and 6 is normally held closed by the spring 571 and by the pressure of the controlled fluid. It is opened by turning the handwheel 72 in a direction to cause the rod 304 to be shifted toward the right, as viewed in FIG. 5, by the cam 71. The bellows 204 in this instance does not operate the valve, but seals the valve opening mechanism from the fluid controlled by the valve.

If it is desired to operate the valve shown in FIGS. 5 and 6 by external pressure fluid as well as manually, the conduit 70 is modified to lead outwardly of the valve housing for connection to a source of pressure fluid, as described above with reference to the conduit 28, and a stuffing box or similar seal is provided in the guide 553 to prevent leakage from the chamber in the bellows 204 to the bore 68 in which atmospheric pressure prevails.

Obviously, the aforementioned materials of construction for the valves of the invention may be replaced by other materials if the operating conditions permit. Bronze housings and other valve parts will thus be satisfactory under many conditions, and plastic parts may be most satisfactory when the pressure and temperature of the controlled fluids are consistent with the working range of the plastics employed.

It is an advantageous feature of the valves of the invention that valves differing from each other in many operating characteristics can be assembled quickly and conveniently from a small number of interchangeable parts because of the flanging of the end walls between the valve housing and the inlet and outlet nipples. The bellows may be preassembled with the associated end walls if so desired and with cup-shaped receptacles for those types of valves requiring such receptacles. The rims of the bellows are preferably secured to engaging other elements by adhesive bonding or by heat sealing if the bellows consists of suitable plastic or similar material. Metallic bellows may be soldered, brazed or welded by induction heating to other metallic components. Adhesive bonds may be strengthened by knurling the exposed side of the plastic bellows after bonding.

What is claimed is:

1. A valve comprising, in combination:
   a. a housing having an axis and two axial end portions open for flow of a fluid through said housing in the direction of said axis;
   b. a valve seat member in said housing defining an aperture extending through said member in said direction;
   c. a valve member axially movable in said housing toward and away from a position of engagement with said valve seat member in which the valve member seals said aperture;
   d. spider means fixedly fastened in said housing;
   e. an axially expandable and contractable bellows member in said housing defining a sealed chamber therein,
      1. one axial end of said bellows member being fixedly fastened to said spider means,
      2. said valve seat member being axially interposed between said valve member and the other axial end of said bellows member;
   f. a valve stem member fastened to said other axial end of said bellows member and to said valve member for moving said valve member toward and away from said position during expansion and contraction of the bellows member;
   g. a conduit communicating with said chamber for flow of fluid into and out of said chamber; and
   h. an annular guide member fixedly mounted in said housing between said valve seat member and said other axial end and receiving said valve stem member for guiding said valve member in said direction.

2. A valve as set forth in claim 1, further comprising spoke means fixedly fastened to said housing and to said guide member.

3. A valve as set forth in claim 2, further comprising yieldably resilient means interposed between said guide member and said other axial end for moving said guide member and said other axial end away from each other in said direction.

4. A valve as set forth in claim 3, wherein said resilient means include a rigid, cup-shaped receptacle having a rim portion fastened to said other axial end and a bottom portion fixedly sealed to said valve stem member, and a spring member partly received in said receptacle and abuttingly engaging said bottom portion.

5. A valve comprising, in combination:
   a. a housing having an axis and two axial end portions open for flow of a fluid through said housing in the direction of said axis;
   b. a valve seat member in said housing defining an aperture extending through said member in said direction;
   c. a valve member axially movable in said housing toward and away from a position of engagement with said valve seat member in which the valve member seals said aperture;
   d. a spider member fixedly fastened in said housing;
   e. an axially expandable and contractable bellows member in said housing defining a sealed chamber therein, one axial end of said bellows member being fixedly fastened to said spider member;
   f. a valve stem member fastened to the other axial end of said bellows member and to said valve member for moving said valve member toward and away from said position during expansion and contraction of the bellows member,
      1. said spider member being formed with an axial bore movably receiving a portion of said valve stem member,
      2. said portion of the valve stem member being sealed in said chamber; and
   g. a conduit communicating with said chamber for flow of fluid into and out of said chamber.

6. A valve comprising, in combination:
   a. a housing having an axis and two axial end portions open for flow of a fluid through said housing in the direction of said axis;
   b. a valve seat member in said housing defining an aperture extending through said member in said direction;
   c. a valve member axially movable in said housing toward and away from a position of engagement with said valve seat member in which the valve member seals said aperture;
   d. spider means fixedly fastened in said housing;
   e. an axially expandable and contractable bellows member in said housing defining a sealed chamber therein, one axial end of said bellows member being fixedly fastened to said spider means;
   f. a valve stem member fastened to the other axial end of said bellows member and to said valve member for moving said valve member toward and away from said position during expansion and contraction of the bellows member;
   g. a conduit communicating with said chamber for flow of fluid into and out of said chamber; and
   h. guide means guiding said valve member in said direction,
      1. said guide means including two guide members axially spaced in said housing and formed with respective axially aligned openings therein,
      2. said valve stem member being slidably received in said openings of said guide members.

7. A valve comprising, in combination:
   a. a housing having an axis and including
      1. a tubular housing member,
      2. a tubular inlet member and a tubular outlet member axially aligned with said housing member and axially offset from the same in opposite directions, said inlet and outlet members being formed with respective openings for axial flow of a fluid through said housing member;
   b. a valve seat member flanged in said housing between said housing member and one of said inlet and outlet members defining an aperture extending through said member in said direction;
   c. a valve member axially movable in said housing toward and away from a position of engagement with said valve seat member in which the valve member seals said aperture;
   d. a spider member fixedly flanged in said housing between the other one of said inlet and outlet members, said spider member and said valve seat member having respective guide portions formed with respective guide openings;
   e. an axially expandable and contractable bellows member in said housing defining a sealed chamber therein, one axial end of said bellows member being fixedly fastened to said spider means;
   f. a valve stem member received in said guide openings and fastened to the other axial end of said bellows member and to said valve member for moving said valve member toward and away from said position during expansion and contraction of the bellows member; and
   g. a conduit communicating with said chamber for flow of fluid into an out of said chamber.

8. A valve comprising, in combination:

a. a housing having an axis and two axial end portions open for flow of a fluid through said housing in the direction of said axis;
b. a valve seat member in said housing having an axially directed seat portion about an aperture extending through said member in said direction;
c. a valve member axially movable in said housing toward and away from a position of engagement with said valve seat member in which the valve member seals said aperture;
d. spider means fixedly fastened in said housing;
e. an axially expandable and contractable bellows member in said housing defining a sealed chamber therein, one axial end of said bellows member being fixedly fastened to said spider means;
f. motion transmitting means connecting the other axial end of said bellows member to said valve member for moving said valve member toward and away from said position during expansion and contraction of the bellows member;
g. a conduit communicating with said chamber for flow of fluid into and out of said chamber;
h. guide means guiding said valve member in said direction; and
i. fastening means for fastening said valve seat member in said housing in two alternative positions in which said seat portion faces toward said bellows member and away from said bellows member respectively.

9. A valve as set forth in claim 8, wherein said motion transmitting means include a valve stem member fastened to said valve member and to said other axial end, said guide means including an axial bore in said spider member movably receiving a portion of said valve stem member sealed in said bellows member.

10. A valve as set forth in claim 8, wherein said valve member has two sealing faces tapering in opposite axial directions for engagement with said seat portion in said two positions of the valve seat member respectively.

11. A valve comprising, in combination:
a. a housing having an axis and two axial ends open for flow of a fluid through said housing in the direction of said axis;
b. a valve seat member in said housing defining an aperture extending through said member in said direction;
c. a valve member axially movable in said housing toward and away from a position of engagement with said valve seat member in which the valve member seals said aperture;
d. spider means fixedly fastened in said housing;
e. an axially expandable and contractable bellows member in said housing defining a sealed chamber therein, one axial end of said bellows member being fixedly fastened to said spider means;
f. a valve stem member fastened to the other axial end of said bellows member and to said valve member for moving said valve member toward and away from said position during expansion and contraction of the bellows member;
g. a conduit communicating with said chamber for flow of fluid into and out of said chamber; and
h. guide means guiding said valve member in said direction,
   1. said guide means having two portions offset from said bellows member in opposite directions and movably engaging respective axial portions of said valve stem member.

12. A valve as set forth in claim 11, further comprising pressure means for forcing a fluid into said chamber through said conduit at a pressure sufficient for axially expanding said bellows member and for thereby axially moving said valve member.

* * * * *

UNITED STATES PATENT OFFICE
CERTIFICATE OF CORRECTION

Patent No. 3,637,187   Dated January 25, 1972

Inventor(s) Manfred Burger

It is certified that error appears in the above-identified patent and that said Letters Patent are hereby corrected as shown below:

In the title page, after line [30] add:

November 20, 1968, Germany    P 18 10 095.3

Signed and sealed this 15th day of August 1972.

(SEAL)
Attest:

EDWARD M. FLETCHER, JR.
Attesting Officer

ROBERT GOTTSCHALK
Commissioner of Patents